Oct. 27, 1931. W. L. ISBILLS 1,828,971
METHOD AND APPARATUS FOR PROJECTING MULTICOLOR RAYS
Original Filed June 21, 1928
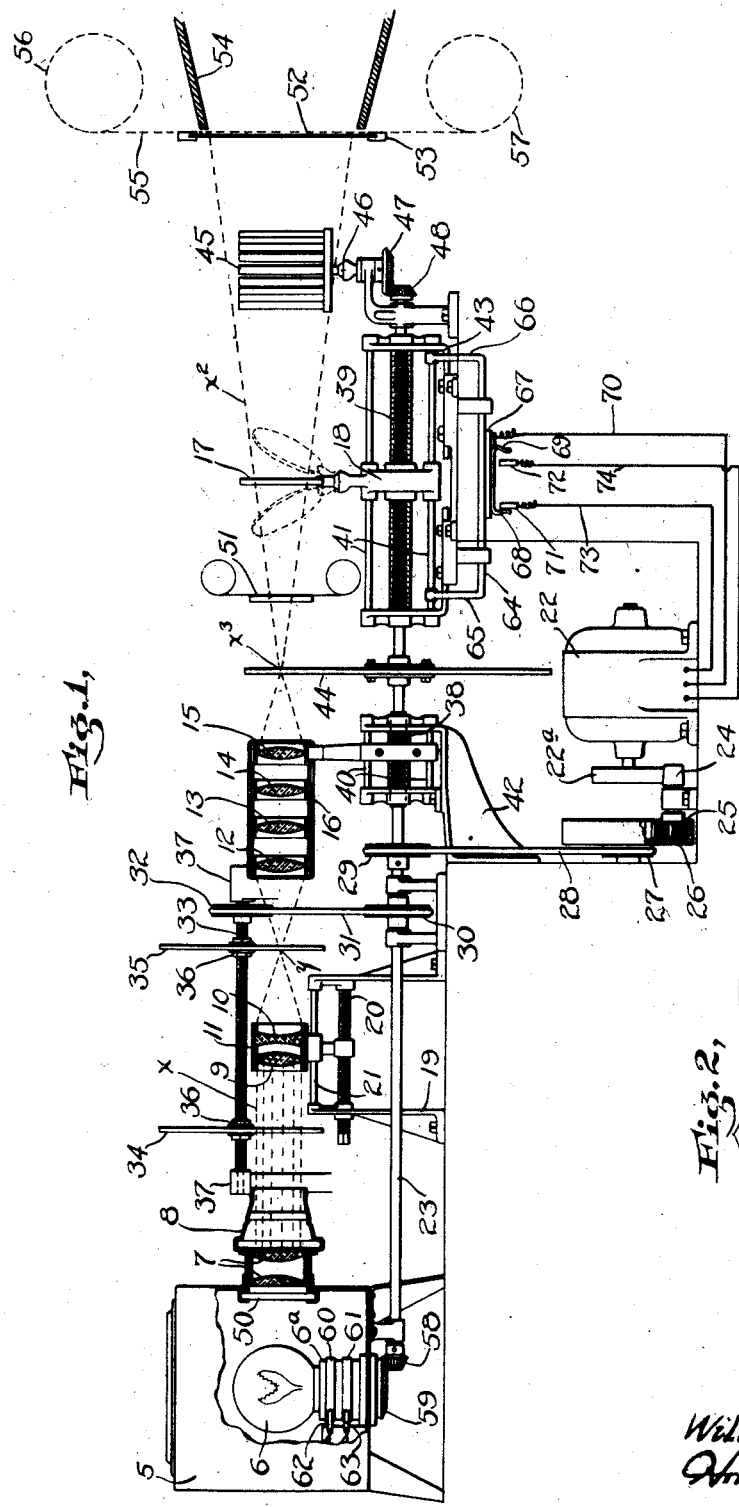
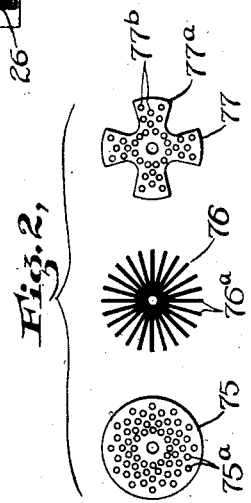
INVENTOR
William L. Isbills
BY
ATTORNEY Patented Oct. 27, 1931

1,828,971

UNITED STATES PATENT OFFICE

WILLIAM L. ISBILLS, OF WESTFIELD, NEW JERSEY

METHOD AND APPARATUS FOR PROJECTING MULTICOLOR RAYS

Application filed June 21, 1928, Serial No. 287,322. Renewed January 21, 1931.

This invention relates to apparatus for projecting a multiplicity of colors onto a screen or through a translucent body or through photographic or other pictures for projection onto a screen; and the object of the invention is to provide an apparatus of the class specified, involving a source of light preferably in the form of an electric bulb and a plurality of lenses disposed in the ray path emanating from said source of light, a predetermined number of said lenses being capable of automatic adjustment longitudinally of the ray path to provide a constant variation of the color rays projected therethrough; a further object being to provide means for supporting a lens universally in the ray path to permit of its universal adjustment in said ray path; a further object being to provide one or more interrupting bodies disposed at predetermined points in the apparatus and extending into and transversing the ray path for breaking up the light rays to intensify and increase the number of distinct and contrasting color light rays projected therefrom and to modify the intensity of the colors in said ray, means being provided for automatically actuating said interrupters to maintain the same in motion in transversing the ray path; a further object being to provide means for automatically rotating the electric bulb of the machine, all of the automatically actuated means being driven through and by means of a power source; a further object being to provide means whereby the direction of revolution of said power source may be reversed to produce back and forth movement of predetermined devices employed in the apparatus; and with these and other objects in view, the invention consists in a method and apparatus for projecting color light rays which is simple in construction and operation and which is hereinafter more fully described and claimed.

The invention described and claimed herein is an improvement on that shown and described in Letters Patent of the United States granted to me August 14, 1928, and numbered 1,680,619 and is fully disclosed in the following specification, of which the accompanying drawings form a part in which the separate parts of my improvement are designated by suitable reference characters in each of the views, and in which:

Fig. 1 is a diagrammatic view of a complete form of the apparatus which I employ; and, Fig. 2 is a plan view of two or three different forms of interrupters which I may employ.

In Fig. 1 of the drawings, I have shown at 5 the lamp house of the projecting apparatus, in which a suitable source of light preferably in the form of an electric bulb 6 is arranged to project a ray of light emanating from said bulb out through condensing lenses 7 supported in conjunction with the lamp house 5. Outwardly of said lenses, is a substantially conical tube 8 for concentrating the light ray emanating from the bulb 6 to a predetermined path designated by the dotted lines $x$. Arranged outwardly of the tube 8 and in spaced relation to the condensers 7 is a double convex lens 9 and a double concave lens 10 arranged in a suitable supporting tube 11. Another set of adjustable double convex lenses 12—13 and 14 and 15 are adjustable relatively to a supporting tube or frame 16 and also relatively to each other. These lenses are arranged in spaced relation with reference to the lenses 9 and 10, and all are in the ray path $x$, the ray path $x$ having crossed at the point $y$ intermediate the lenses 10 and 12.

Another lens 17 is arranged in the ray path $x2$ which is crossed beyond the lenses 12 to 15 inclusive as seen at the point $x3$. Said lens 17 has a universal mounting at 18 to permit of its rotation and backward and forward inclined adjustment in the ray path $x2$.

The lenses 9 and 10 are supported in connection with a frame 19 having a screw shaft 20 in connection with which the supporting tube 11 is mounted. The tube 11 is keyed to the frame by a rod 21 on which said tube is slidably mounted, the same being adjusted by the rotation of the screw 12 by hand or in any other desired manner. This adjustment is for focusing and other purposes, producing varied results in the projection of color rays.

I also employ a power source preferably in the form of a reversible drive electric motor 22 adapted to rotate an elongated main drive shaft 23 preferably through a low ratio of gearing, which in the construction shown is accomplished by a comparatively large friction wheel 22a driven directly by the motor 22, driving a stub shaft through a small friction wheel 24, which in turn rotates a pinion 25 meshing with an internal gear 26 on which is a pulley 27, around which is passed a belt 28 which also passes around a pulley 29 on the shaft 23. But, it will be understood that any suitable means may be accomplished to provide a comparatively slow revolution of the shaft 23 in any ratio of gearing between said shaft and a power source.

On the shaft 23 is a pulley 30 around which a belt 31 is passed, the latter passing around another pulley 32 on a supplemental drive shaft 33. The shaft 33 is screw threaded throughout the major portion of its length to adjustably support thereon two interrupters 34 and 35 held in position by lock nuts 36, it being understood that either one or both of said interrupters may be employed, the interruper 35 being arranged to transverse the ray path at or adjacent the crossing point at y. The shaft 33 is supported in suitable bearing 37 partially indicated in Fig. 1.

The main drive shaft 23 is provided at one end portion with a comparatively fine threaded portion 38 and a comparatively coarse threaded portion 39, the comparative pitch of which is such as to provide differential movements in a given ratio between the frame 16 and the universal support 18, both of which are in threaded engagement with the respective screw portions 38 and 39, as clearly seen in the drawings. The frame 16 is keyed and guided by rods 40 whereas the universal support 18 is also keyed and guided by rods 41, the former being supported in connection with a bracket or frame member 42 and the latter in connection with a frame member 43. Arranged on the shaft 23 is an interrupter 44 which is adapted to transverse the light rays at or adjacent the crossing point x3 of the light rays. Another interrupter 45 is arranged outwardly of the lens 17 and is mounted to rotate on a vertical shaft 46 geared in connection with the shaft 23 through beveled gears 47 and 48. The last named interrupter has circumferentially spaced vertical fingers which are adapted to rotate through the ray path x2 in a horizontal plane.

I also preferably provide means in the form of a channel frame 50 within the lamp house 5 and adjacent one of the condensers 7 for supporting interrupting or other bodies of predetermined contour therein for producing ornamental or other effects.

At 51, I have also indicated at a point outwardly of the crossing of the rays at x3 means for supporting and guiding a moving picture film or a photographic film plate or other body, preferably of a translucent or a substantially translucent nature, through which the color rays are adapted to pass. In the case of moving picture films and the like, it will be understood that colored pictures may be projected onto a screen in the manner disclosed in my earlier application hereinbefore referred to. But, in the latter use, the lens 17 and interrupter 45 will not be employed, nor will the translucent screen 52 shown in Fig. 1 be employed.

The screen 52 is supported in a suitable frame 53 in the path of the rays x2. In the use of the apparatus for projecting color light rays only, in the many shapes and forms that are possible by means of my improved apparatus, these color rays are collected and may be visualized on said screen and projected therethrough if desired onto another screen or body or on a hopper-shaped reflector member 54. It will also be understood that I may, if desired, move a screen or film-like body 55 transversely of the ray path x2 where the screen 52 is located when said screen 52 is removed. The screen or film 55 is preferably arranged on rolls 56 and 57.

The socket 6a of the bulb 6 is rotated supported in the lamp house and is actuated through a beveled pinion 58 on the shaft 23, meshing with a beveled gear 59 on said socket. The socket has two annular contact rings 60 and 61 with which the circuit wires from a source of supply, contacts through brushes 62 and 63 bearing on the rings 60 and 61 respectively.

A switch device 64 is arranged adjacent the screw 39 and comprises an elongated body having projecting arms 65 and 66 at the ends thereof, supported in the path of the universal mounting 18 adjacent the ends of the screw 39. On the crosshead of said switch and supported on a block of insulating material 67 are two spring contacts 68 and 69, both in circuit with a wire 70 leading to the motor 22. Two fixed contacts 71 and 72 are in circuit with wires 73 and 74 also leading to said motor.

In the operation of the machine, one of the contacts 71—72 will be in engagement with one of the spring contacts 68—69 supported on the switch 64, the contacts 71 and 68 being shown in engagement in Fig. 1 assuming that the direction of revolution of the motor 22 is now feeding the lens 17 and lenses 12 to 15 inclusive to the left. It will be understood that when the universal support 18 strikes the arm 65 and moves it to the left, the circuit will be broken through the contacts 68 and 71 and closed through the contacts 69 and 72 reversing the rotation of the motor 22, causing the aforenamed lenses to be fed backwardly or to the right as seen in the drawings, until such time as the arm 66 is not engaged to break the circuit through the contacts 69 and 72, recompleting the circuit through the contacts 68 and 71. It will therefore be seen that the said lenses 12 and 15 and 17 may be continuously maintained in operation, producing constantly varied results as long as the motor 22 is maintained in operation.

In the accompanying drawings, I have shown a comparatively large collection of devices or mechanism, especially in the form of lenses and interrupters. While all of these devices may be employed in a single apparatus, it will also be understood that any one or more of the separate lenses or interrupters may be dispensed with or removed from operative position, and still the apparatus will function to produce predetermined and desired results. For example, the interrupter 35 alone may be employed, omitting all other interrupters shown. This also applies to the specific use of any other interrupter device and its particular location shown in the accompanying drawing, it being understood that I am not necessarily limited to the specific relative positions of the parts disclosed.

It will also be understood that a combination of any two or three of the interrupters may be employed, it being apparent that the greater number of interrupters employed will produce more varied effects and a more complete breaking up of the color rays emanating from the source of light. In like manner, I may dispense with the lenses 9 and 10 or one or two of the lenses 12 to 15 inclusive or a portion of each of said group of lenses, and the lens 17 may or may not be employed. In connection with the lens 17 and by virtue of its universal adjustment of my apparatus, by slight movements thereof, entirely different color rays may be projected onto the screen 52 or any other object onto or through which it is desired to pass said rays. It is also not absolutely essential that the electric bulb 6 be rotated, but this is preferred, and various other changes in and arrangements of the several parts or devices may be performed in the production of any desired color ray projection.

In Fig. 2 of the drawings, I have shown at 75, 76 and 77 three different forms of interrupters which I may employ, where the interrupters 34, 35 and 44 are indicated in Fig. 1 of the drawings.

The interrupter 75 is in the form of a perforated disk, the rays of light passing through the perforations 75a therein, and these may be of any desired size or may be a combination of sizes. The interrupter 76 consists of a disk-like body, the major portion of which is subdivided by radial cuts to form a plurality of radially extending fingers 76a. The interrupter 77 comprises a fan-like or blade-like body, the radially extending blades of which are of comparatively wide area and are preferably perforated as seen at 77b. The illustrations in Fig. 2 of the drawings are only indications of the many types, shapes and forms of interrupter bodies that I may employ, my invention not being limited to the use of any particular kind or class of interrupter.

As in the invention forming the subject matter of my prior application hereinbefore referred to, I have found that a source of light such for example as an electric bulb, will emanate light rays having all of the rainbow colors in every possible shade and tone, and these color rays can be controlled, collected and utilized in projecting pictures or in utilizing such color rays for commercial and advertising purposes. For example, I may project the rays from my apparatus in the many possible forms of the assemblage of its devices, to project color rays in predetermined shapes, designs or patterns onto a screen such as the screen 52 which is preferably translucent so as to collect the color values, rendering the same visible on the screen, preferably through a conical or hopper-shaped device such as 54 for examination, to acquire and reproduce the unlimited number of designs capable of production by my machine for any commercial purpose, for example in blending and designing fabrics or materials of any kind or class, suitable for the many uses in wearing apparel, draperies, rugs, carpets and all other classes of fabric goods whether in silk, cotton, wool or the like, it being understood that my improved apparatus will create and produce new designs in unlimited arrangements of blending and harmonized color values, regardless of the specific commercial use thereof.

It will also be understood that the apparatus as a whole and including the screen 52 may be used as an advertising medium for attracting attention in store windows and other places of business or in buildings of any kind or class, it being understood that the apparatus may be operated for an unlimited length of time, and by virtue of the automatic manual and other adjustments possible, no two similar designs of combinations of color values would be produced through said unlimited period of time.

It will also be understood, however, that in the commercial use of the apparatus for producing or creating color designs, the machine may be stopped from time to time, or may be so accurately geared as to maintain or recover at any time, a particular design produced by the apparatus, it being understood that when all of the interrupters cease operation and are held stationary, one different design and arrangement of color values will be maintained on the screen 52 and held there until reproduced by an artist or by other means of reproduction.

The operation of my improved apparatus will be readily understood from the specific descriptions hereinbefore set forth, and being based on the broad principle disclosed in my prior patent, it being understood that the light rays emanating from the bulb 6 first pass through the condensers 7 and then through the lenses 9 and 10, the rays crossing at $y$ prior to passing through the lenses 12 to 12 inclusive. In projecting from the lens 15, the rays again cross at $x3$ and project through the ray path $x2$ to the screen 52. It is the chromatic aberration relation between the separate lenses 9—10 and 12 to 15 inclusive, that to a major degree, makes it possible to collect and intensify the multiple color rays emanating from the light source, the various interrupters employed breaking up these color rays and producing other combinations or blends of colors, producing the results desired in apparatus of this class.

It will be understood from the foregoing, that my invention is not necessarily limited to any specific arrangement of the several parts of my improved apparatus, nor am I necessarily limited to any particular use thereof, and various other changes in and modifications of the structure herein disclosed, may be made within the scope of the appended claims without departing from the spirit of my invention or sacrificing its advantages.

Having fully described my invention, what I claim as new and desire to secure by Letters Patent, is:

1. An apparatus for projecting color rays onto a screen or receiving body comprising a source of illumination, a plurality of lenses disposed in the ray path emanating from said source, predetermined lenses being arranged in chromatic aberration with respect to each other, and means involving a driving mechanism for automatically moving one of said lenses longitudinally of the ray path during the operation of the apparatus.

2. An apparatus for projecting color rays onto a screen or receiving body comprising a source of illumination, a plurality of lenses disposed in the ray path emanating from said source, predetermined lenses being arranged in chromatic aberration with respect to each other, means involving a driving mechanism for automatically moving one of said lenses longitudinally of the ray path during the operation of the apparatus, and means in operative connection with said drive mechanism for automatically moving another lens longitudinally of the ray path and at a speed contrasting to that of the first named lens.

3. An apparatus for projecting color rays onto a screen or receiving body comprising a source of illumination, a plurality of lenses disposed in the ray path emanating from said source, predetermined lenses being arranged in chromatic aberration with respect to each other, means involving a driving mechanism for automatically moving one of said lenses longitudinally of the ray path during the operation of the apparatus, means in operative connection with said drive mechanism for automatically moving another lens longitudinally of the ray path and at a speed contrasting to that of the first named lens, and a plurality of the other lenses being collectively movable with respect to the first two lenses.

4. In a projecting apparatus of the class described, a source of light, condensing lenses arranged in the ray path emanating from said light source, a lens unit arranged in spaced relation to said condensing lenses and in said ray path, another lens intermediate the lens unit and said condensing lenses and in chromatic aberration with relation thereto, and means whereby the lens unit and last named lens may be relatively adjusted and a driving means for automatically adjusting the lens unit in the operation of the apparatus.

5. In a projecting apparatus of the class described, a source of light, condensing lenses arranged in the ray path emanating from said light source, a lens unit arranged in spaced relation to said condensing lenses and in said ray path, another lens intermediate the lens unit and said condensing lenses in chromatic aberration with relation thereto, means whereby the lens unit and last named lens may be relatively adjusted, and another lens outwardly of said lens unit and in said ray path, said last named lens being adjustable toward and from the lens unit and universally adjustable in the ray path.

6. In a projecting apparatus of the class described, a source of light, condensing lenses arranged in the ray path emanating from said light source, a lens unit arranged in spaced relation to said condensing lenses and in said ray path, another lens intermediate the lens unit and said condensing lenses in chromatic aberration with relation thereto, means whereby the lens unit and last named lens may be relatively adjusted, another lens outwardly of said lens unit and in said ray path, said last named lens being adjustable toward and from the lens unit and universally adjustable in the ray path, and an interrupter in said ray path.

7. In a projecting apparatus of the class described, a source of light, condensing lenses arranged in the ray path emanating from said light source, a lens unit arranged in spaced relation to said condensing lenses and in said ray path, another lens intermediate the lens unit and said condensing lenses in chromatic aberration with relation thereto, means whereby the lens unit and last named lens may be relatively adjusted, another lens outwardly of said lens unit and in said ray path, said last named lens being adjustable toward and from the lens unit and universally adjustable in the ray path, and a plurality of interrupters in said ray path and intermediate said lenses.

8. In a projecting apparatus of the class described, a source of light, condensing lenses arranged in the ray path emanating from said light source, a lens unit arranged in spaced relation to said condensing lenses and in said ray path, another lens intermediate the lens unit and said condensing lenses in chromatic aberration with relation thereto, means whereby the lens unit and last named lens may be relatively adjusted, another lens outwardly of said lens unit and in said ray path, said last named lens being adjustable toward and from the lens unit and universally adjustable in the ray path, a plurality of interrupters in said ray path and intermediate said lenses, and means involving an electric motor, for automatically actuating all of said interrupters.

9. In a projecting apparatus of the class described, a source of light, condensing lenses arranged in the ray path emanating from said light source, a lens unit arranged in spaced relation to said condensing lenses and in said ray path, another lens intermediate the lens unit and said condensing lenses in chromatic aberration with relation thereto, means whereby the lens unit and last named lens may be relatively adjusted, another lens outwardly of said lens unit and in said ray path, said last named lens being adjustable toward and from the lens unit and universally adjustable in the ray path, a plurality of interrupters in said ray path and intermediate said lenses, and means involving an electric motor, for automatically actuating all of said interrupters, and for moving said lens unit longitudinally of the ray path.

10. In a projecting apparatus of the class described, a source of light, condensing lenses arranged in the ray path emanating from said light source, a lens unit arranged in spaced relation to said condensing lenses and in said ray path, another lens intermediate the lens unit and said condensing lenses in chromatic aberration with relation thereto, means whereby the lens unit and last named lens may be relatively adjusted, another lens outwardly of said lens unit and in said ray path, said last named lens being adjustable toward and from the lens unit and universally adjustable in the ray path, a plurality of interrupters in said ray path and intermediate said lenses, and means involving an electric motor, for automatically actuating all of said interrupters and for moving said lens unit longitudinally of the ray path, and for automatically moving the universally supported lens longitudinally of the ray path at a speed differential to that of the movement imparted to the lens unit.

11. In a projecting apparatus of the class described, a source of light, condensing lenses arranged in the ray path emanating from said light source, a lens unit arranged in spaced relation to said condensing lenses and in said ray path, another lens intermediate the lens unit and said condensing lenses in chromatic aberration with relation thereto, means whereby the lens unit and last named lens may be relatively adjusted, another lens outwardly of said lens unit and in said ray path, said last named lens being adjustable toward and from the lens unit and universally adjustable in the ray path, a plurality of interrupters in said ray path and intermediate said lenses, and means involving an electric motor, for automatically actuating all of said interrupters and for moving said lens unit longitudinally of the ray path and for automatically moving the universally supported lens longitudinally of the ray path at a speed differential to that of the movement imparted to the lens unit, and said source of light comprising an electric bulb having a rotatable socket automatically rotatable through said electric motor.

12. In a projecting apparatus of the class described, a source of light, condensing lenses arranged in the ray path emanating from said light source, a lens unit arranged in spaced relation to said condensing lenses and in said ray path, another lens intermediate the lens unit and said condensing lenses in chromatic aberration with relation thereto, means whereby the lens unit and last named lens may be relatively adjusted, another lens outwardly of said lens unit and in said ray path, said last named lens being adjustable toward and from the lens unit and universally adjustable in the ray path, a plurality of interrupters in said ray path and intermediate said lenses, and means involving an electric motor for automatically actuating all of said interrupters and for moving said lens unit longitudinally of the ray path, and for automatically moving the universally supported lens longitudinally of the ray path at a speed differential to that of the movement imparted to the lens unit, said source of light comprising an electric bulb having a rotatable socket automatically rotated through said electric motor, said electric motor being capable of forward and reverse drives and a switch automatically actuated in the movement of one of said longitudinally movable lenses for controlling the forward and reverse drive of said motor and the automatic forward and backward movement of said lenses.

13. The combination with a projecting apparatus involving a source of light, condensing lenses and projecting lenses arranged in the ray path emanating from said source of light and condensing lenses and in chromatic aberration with respect to each other, of means involving a driven member for automatically actuating one of said projecting lenses in the operation of the apparatus.

14. The combination with a projecting apparatus involving a source of light, condensing lenses and projecting lenses arranged in the ray path emanating from said source of light and condensing lenses and in chromatic aberration with respect to each other, of means for automatically actuating one of said projecting lenses in the operation of the apparatus, an automatically actuated interrupter transversing the ray path, and means involving an electric motor for actuating said interrupter and movable lens.

15. In an apparatus of the class described comprising a source of light and projecting lenses in the ray path emanating therefrom, a main shaft having a screw threaded portion, means for rotating said shaft, and one of said projecting lenses being supported in a frame in threaded engagement with the screw portion of the shaft whereby in the rotation of said shaft, said lens is moved longitudinally of the ray path, and an electric motor in operative connection with said main shaft to provide automatic movement to automatically operate said movable lens in the operation of the apparatus.

16. In an apparatus of the class described comprising a source of light and projecting lenses in the ray path emanating therefrom, a main shaft having a screw threaded portion, means for rotating said shaft, and one of said projecting lenses being supported in a frame in threaded engagement with the screw portion of the shaft whereby in the rotation of said shaft, said lens is moved longitudinally of the ray path, and an interrupter actuated through said main shaft and adapted to move transversely of said ray path.

17. In an apparatus of the class described comprising a source of light and projecting lenses in the ray path emanating therefrom, a main shaft having a screw threaded portion, means for rotating said shaft, and one of said projecting lenses being supported in a frame in threaded engagement with the screw portion of the shaft whereby in the rotation of said shaft, said lens is moved longitudinally of the ray path, an interrupter actuated through said main shaft and adapted to move transversely of said ray path, and another universally supported lens in threaded engagement with said main shaft and actuated longitudinally of the ray path thereby.

18. The herein described method of projecting a multiplicity of contrasting color rays in predetermined and varied designs onto a screen which consists in arranging predetermined lenses in the ray path emanating from a source of light, and providing means for automatically moving a predetermined number of said lenses in said ray path and within chromatic aberration relation to another of said lenses.

19. The herein described method of projecting a multiplicity of contrasting color rays in a multiplicity of designs onto a translucent body which consists in arranging predetermined projecting lenses in chromatic aberration relation in the ray path emanating from a source of light, and automatically moving spaced lenses longitudinally of the ray path to constantly vary and change the color values and designs projected onto said translucent body.

20. The herein described method of projecting a multiplicity of contrasting color rays in a multiplicity of designs onto a translucent body which consists in arranging predetermined projecting lenses in chromatic aberration relation in the ray path emanating from a source of light, moving interrupting means transversely of the ray path at predetermined spaced intervals, and automatically moving spaced lenses longitudinally of the ray path to constantly vary and change the color values and designs projected onto said translucent body.

In testimony that I claim the foregoing as my invention I have signed my name this 15th day of June, 1928.

WILLIAM L. ISBILLS.